United States Patent [19]
Camezon et al.

[11] Patent Number: 5,899,565
[45] Date of Patent: May 4, 1999

[54] MICROWAVE RESISTANT MIXING DEVICE

[76] Inventors: Raymond E. Camezon, Danville; Klaus Silbermann, Sunol, both of Calif.

[21] Appl. No.: 09/047,199

[22] Filed: Mar. 24, 1998

[51] Int. Cl.⁶ .............................. B01F 15/00; H04B 6/80
[52] U.S. Cl. ........................... 366/197; 219/726; 219/729
[58] Field of Search .............................. 366/96–98, 130, 366/146, 197–199, 347, 349; 99/348, DIG. 14; 219/725, 726, 729, 751

[56] References Cited

U.S. PATENT DOCUMENTS

| | | | |
|---|---|---|---|
| 2,616,673 | 11/1952 | Van Guilder | 366/197 |
| 4,277,181 | 7/1981 | Stahly et al. | 366/98 |
| 4,400,401 | 8/1983 | Beauvais et al. | |
| 4,406,860 | 9/1983 | Beauvais et al. | |
| 4,406,861 | 9/1983 | Beauvais et al. | |
| 4,409,454 | 10/1983 | Beauvais et al. | |
| 4,822,172 | 4/1989 | Stottmann | 366/98 |
| 4,904,834 | 2/1990 | Bowen | 366/146 |
| 4,959,517 | 9/1990 | Jump et al. | 366/244 |
| 5,021,621 | 6/1991 | Demmer et al. | 99/348 |
| 5,271,673 | 12/1993 | Bohnet et al. | 99/DIG. 14 |

Primary Examiner—Charles E. Cooley
Attorney, Agent, or Firm—Theodore J. Bielen, Jr.

[57] ABSTRACT

A microwave resistant mixing device that is particularly useful for food preparation utilizing a motor which includes a moving mixing arm or paddle. The motor is further provided with a coupling for detachably mechanically linking the mixing arm to the motor. A housing provides a wall that forms a chamber to contain the motor. The housing also is constructed with an opening that provides access to the mixing arm coupling of the motor. A first shield prevents microwaves from entering the housing chamber through the housing wall. A second shield prevents microwaves from entering the housing chamber through the opening in the housing wall.

13 Claims, 1 Drawing Sheet

MICROWAVE RESISTANT MIXING DEVICE

BACKGROUND OF THE INVENTION

The present invention relates to a novel microwave resistant mixing device.

Microwave ovens are quite common in households and commercial food preparation establishments. Although microwave ovens are capable of cooking foods, most users only employ microwave ovens to defrost or reheat foods. This is believed due to the fact that cooking in a microwave oven usually requires attendance by the user to stop the cooking process, open the door of the microwave oven, stir the food being cooked and restart the cooking process during short intervals of time.

Microwave cooking also requires that containers be constructed of certain materials to prevent heating and destruction of those containers while the cooking process takes place. Also, early microwave ovens were constructed with glass-encased magnetrons. Any conductive metallic material placed in a microwave in such early microwave ovens endangered such glass-encased magnetrons. That is to say, metallic material in such ovens reflected a portion of the microwaves causing heat buildup, resulting in destruction of the glass-encased magnetron. Since 1980, however, microwave ovens have been constructed with ceramic-encased magnetrons that are capable of withstanding the extra heat generated by metallic items in the microwave. The only precaution necessary would be to insulate metallic members from the metallic housing of the microwave oven, which is simply achieved by the placement of a glass tray or plate beneath the metallic member.

U.S. Pat. Nos. 4,400,401, 4,406,860, 4,406,861, and 4,409,454 show microwave oven containers which employ non-metallic jars that are used in microwaves oven in the canning process.

A mixing device which is compatible with a microwave oven would be a notable advance in the food processing industry.

SUMMARY OF THE INVENTION

In accordance with the present invention a novel and useful microwave resistant mixing device is herein provided.

The microwave resistant mixing device of the present invention utilizes motor means for moving an associated mixing arm or paddle which is normally used to agitate or stir food products. The motor means includes a coupling for mechanically and detachable linking the mixing arm to the same. Such motor means and coupling may take the form of a snap-in type linkage, known in the prior art.

The device of the present invention also includes a housing having a wall forming a chamber for containing the motor means and the included coupling. The housing is provided with an opening to the chamber for access to the motor means coupling. Such access permits the mixing arm to be inserted or removed from the motor means as desired by the user.

A first shield is found in the present invention for preventing microwaves from entering the housing chamber through the housing wall. Of course, the mixing device of the present invention would be exposed to such microwaves when it is placed for example, in a microwave oven. The wall of the housing includes an interior surface which is adjacent the chamber and the motor means within the chamber. Likewise, the housing wall is provided with an exterior surface outside the chamber which is in direct exposure to the emanating microwaves within a microwave oven. The first shield may take the form of a layer of microwave reflective material adjacent the wall of the housing. Such layer may lie adjacent the interior surface of the wall of the housing, the exterior surface of the wall of the housing, or adjacent both the interior and exterior surfaces of the wall of the housing. A material which is electrically conductive, such as metals would suffice to constitute the first shield in this regard. For example, chromium, copper, nickel, and the like would serve this purpose. Such metallic material may be clad, plated, laminated, or otherwise placed along the interior and/or exterior surfaces of the wall of the housing. Moreover, establishment of the first shield may be effected by constructing the housing of an all metallic material or of a non-metallic material having metallic particles dispersed therewithin. In any case, a metallic material serves as a barrier to prevent microwaves from passing to the chamber of the housing.

In addition, a second shield is utilized in the present invention for preventing microwaves from entering the housing chamber through the opening in the housing wall. The second shield may comprise a plate of microwave reflective material, fabricated of any of the metals used with respect to the first shield. The plate is transversely located relative to the opening of the housing chamber. The second shield may be mounted to the housing in surrounding relationship with the mixing arm or may be attached directly to the mixing arm. In the latter case, the plate would be placed over the opening to the housing when the mixing arm is coupled to the motor means. In addition, the second shield, in the form of a metal plate, would require a circumferential gap to obviate electrical arcing between the plate and portions of the housing or coupling. Further, the opening to the housing chamber may be provided with a lip which is generally shaped like a spout. The projecting wall of the lip forms an open chamber which extend outwardly from the opening to the chamber. Sizing of said open chamber is such to prevent any dimension of such open chamber from exceeding ⅛ of the wavelength of a typical microwave. That is to say, the diameter or depth of the chamber of the lip should not exceed this criteria.

It may be apparent that a novel and useful mixing device which is resistant to heating by microwaves has been heretofore been described.

It is therefore an object of the present invention to provide a microwave resistant mixing device which may be placed in a microwave oven to stir or mix foodstuffs being cooked by the microwave oven.

It is another object of the present invention to provide a microwave resistant mixing device which simplifies the cooking process in a microwave oven.

Another object of the present invention is to provide a microwave resistant mixing device in the form of a hand held mixer which may be employed inside or out of a microwave oven.

A further object of the present invention is to provide a microwave resistant mixing device which may be placed in a microwave oven and is capable of operating while microwave heating takes place, thus conserving heat.

A further object of the present invention is to provide a microwave resistant mixing device which eliminates "boil over" due to hot spots which developed in the cooking process of the prior art using a microwave oven.

The invention possesses other objects and advantages especially as concerns particular characteristics and features thereof which will become apparent as the specification continues.

Figure 1:
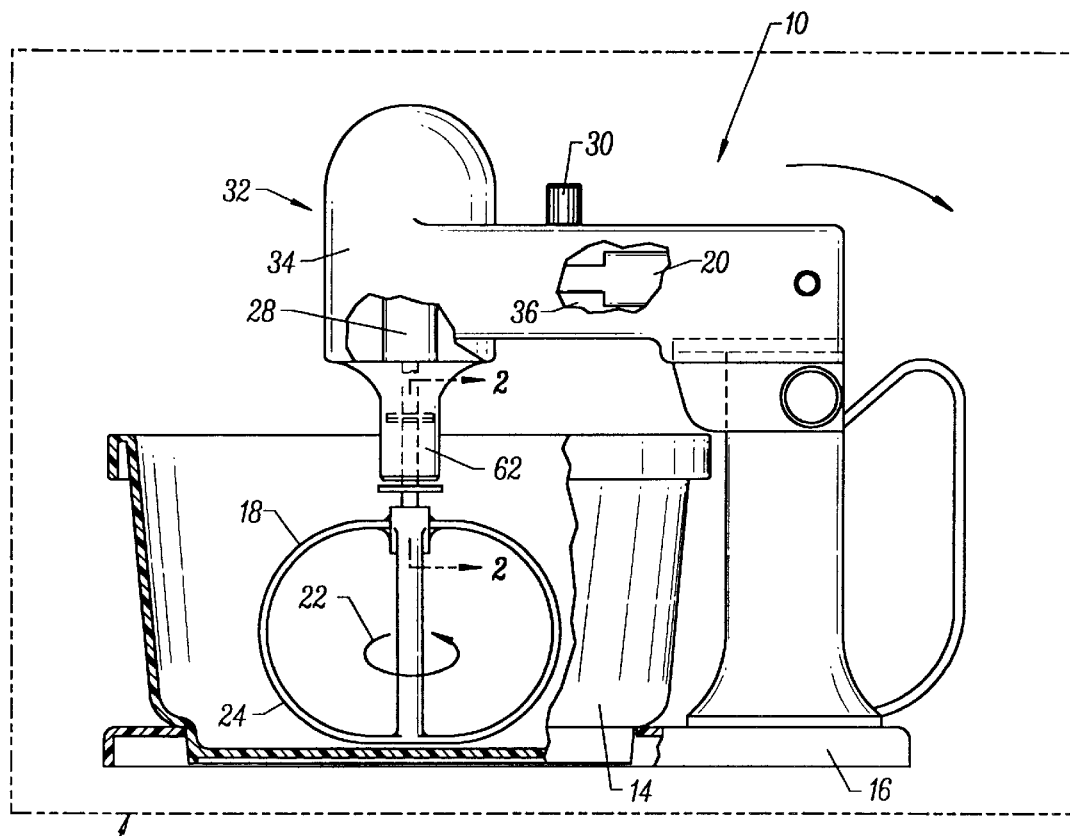
FIG. 1 is a side elevational view of the mixing device of the present invention within a schematically depicted microwave oven, with a portion of a mixing bowl in section.

For a better understanding of the invention references made to the following detailed description of the preferred embodiments thereof which should be taken in conjunction with the hereinabove described drawings.

DETAILED DESCRIPTION OF THE PREFERRED EMBODIMENTS

Various aspects of the present invention will evolve from the following detailed description of the preferred embodiments which should be referenced to the prior described drawings.

The invention as a whole is shown in the drawings by reference character 10. The mixing device 10 is intended for use within a microwave oven 12 which emits microwaves for the purpose of heating. Mixer 10 is used in conjunction with a mixing bowl 14 and is supported on a stand 16 constructed of microwave compatible material. Mixing device 10 is also used in conjunction with a detachable mixing arm or paddle 18, which is of conventional configuration. Needless to say, paddle 18 is intended to turn within bowl 14 to stir or mix foodstuffs in microwave oven 12.

Device 10 includes as one of its elements motor means 20 which is intended to turn paddle 18 according to directional arrow 22. Although a single paddle is depicted in FIG. 1, device 10 may operate with multiple paddles. Motor means 20 may take the form of a battery-operated motor and paddle coupling, such as one found in the prior art under the designation, Black and Decker, Handy Mixer, model number 92-10. Mixing arm 18 includes a blade 24 which terminates in an upper shaft 26. Shaft 26 detachably engages a coupling 28 which is a portion of motor means 20. It should be noted that motor means 20, coupling 28, and shaft 26 are of generally conventional configuration, FIGS. 1 and 2. Battery-operated motor means 20 may be turned on and off by switch 30, which may be rotary, sliding, or the like. In the latter cases switch 30 may impart various speeds to paddle 18, FIGS. 1 and 2.

The device 10 of the present invention is also provided with a housing 32 having a wall portion 34 forming a chamber 36 therewithin. Wall portion may be a plastic or metallic material, the details of which will be explained hereafter. Chamber 36 contains motor means 20. Chamber 36 also includes an opening 38 in the vicinity of coupling 28 to permit shaft 26 of mixing arm 18 to pass in and out of chamber 36 for the purpose of coupling.

Figure 2:
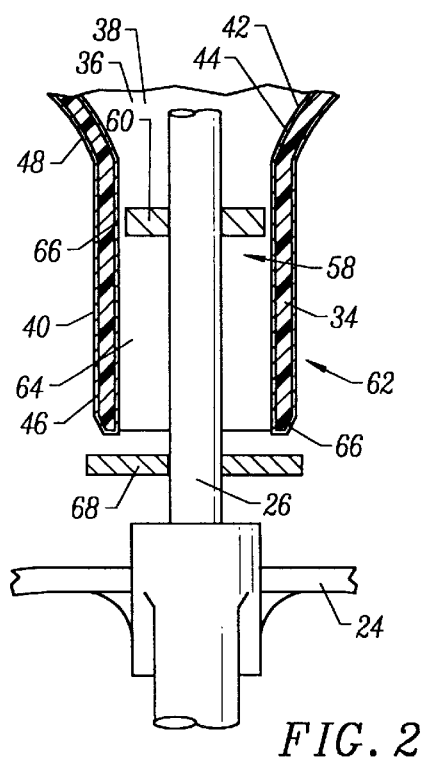
FIG. 2 is a sectional view taken along line 2—2 of FIG. 1 depicting a portion of the mixing arm and the opening to the housing.
Figure 3A:
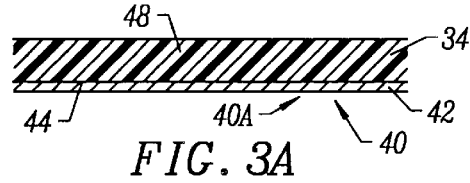
FIG. 3 is a sectional view showing a first embodiment of the housing wall.
FIG. 3B is a sectional view showing a second embodiment of the housing wall.
FIG. 3C is a sectional view showing a third embodiment of the housing wall.
FIG. 3D is a sectional view showing a fourth embodiment of the housing wall.

Housing 32 possesses a first shield 40 for preventing microwaves from entering housing chamber 36, which is depicted in part in the embodiments shown in FIGS. 3A–3D. Microwaves are generally deemed to have frequencies between 1,000 and 30,000 hertz. Referring to FIG. 2, first shield 40 takes the form of a layer 42 which lies adjacent inner surface 44 of wall 34. Layer 42 may be composed of any electrically conductive material which is capable of reflecting microwaves. For examples copper, chromium, nickels and the like suffice in this regard. Layer 42 may be clad, plated, laminated, or otherwise placed against inner surface 44 of wall 34 to prevent microwaves from entering chamber 36. FIG. 3A depicts the first embodiment 40A of first shield 40 of FIG. 2.

Figure 3B:
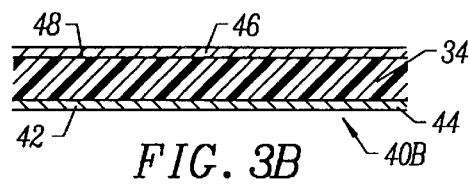

FIG. 3B shows a second embodiment of first shield 40B where wall 34 is overlain by layers 46 and 42. Thus, layer 46 would overlie the outer surface 48 of wall 34. Layers 42 and 46 may be composed of the same microwave reflecting material or of different microwave reflecting material.

Figure 3C:
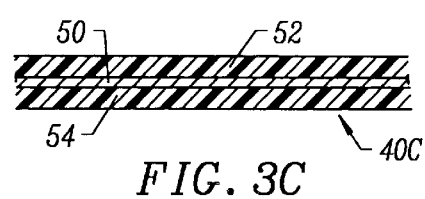

FIG. 3C depicts a third embodiment of first shield 40C. In this case, a layer 50 of microwave reflecting material lies between wall portions 52 and 54. Wall portions 52 and 54 as well as layer 50 form housing 32. It should be noted that wall portions 34, 52 and 54 may be of non-microwave reflective material such as a plastic or the like.

Figure 3D:

FIG. 3D shows fourth embodiment 40D of first shield in which housing 32 is composed of a wall 56 utilizing a plastic material dispersed with particles of microwave reflecting material, such as the metals heretofore described, in sufficient quantity to reflect microwaves.

Of course, housing 32 may be composed of wall 34 constructed of only metallic material. In addition, layer 42 depicted in FIG. 3A may lie on the outside of wall 34 i.e., against outer surface 48 rather than against inner surface 44 of the same. It is anticipated that the embodiment of 33 would be preferable in certain cases to alert the user that the mixing device of the present invention, having a metallic outer surface, is one that would be useable in microwave oven 12.

Turning again to FIG. 2 a second shield 58 is depicted to prevent microwaves from entering opening 38 of chamber 36. In this regard, second shield 58 takes the form of a metallic plate 60 which lies at opening 38 to chamber 36. Plate 60, press fitted to shaft 26, may be composed of the same metallic material heretofore described with respect to first shield 40. In addition, opening 38 is further protected by a lip 62 which is in the shape of a spout. Lip 62 includes the same wall layering protection depicted in FIG. 3A–3D or described hereinbefore with respect to first shield 40. In addition, lip 62 is sized to define a cut off structure, i.e., ¼ wave cut-off, either by choke joint or short-circuited line means. In this manner, microwaves do not effectively enter chamber 64 of lip 62. It should be realized that multiple lips, similar to lip 62, would be employed where multiple mixing arms are used with device 10. In addition, shield 60 prevents any possibility of penetration into chamber 36 of microwaves. It should be noted, that a gap 66 between plate 60 and wall 34 exists to obviate possibility of electrical arcing. Finally, flange 68 prevents the entry of solid matter from the foodstuff, being stirred by mixing arm or paddle 18, from entering chamber 64.

In operation, the user places device 10 within microwave oven 12 and fills bowl 14 with a foodstuff to be stirred or agitated during the cooking process afforded by microwave oven 12. Mixing arm 18 is coupled to battery-operated motor means 20 and switch 30 is operated to activate motor means 20. The door to microwave oven 12 is then closed and the cooking process is programmed and carried out while mixing occurs due to the turning of blade 24 of paddle 18. Mixing device 10 is not affected by microwaves and will not be heated or damaged while in the microwave oven 12 during the cooking process.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A microwave resistant mixing device having a mixing arm, comprising:
    a. motor means for moving the mixing arm; said motor means including a coupling mechanically linked to the mixing arm;
    b. a housing having a wall forming a chamber for containing said motor means, said housing wall including an opening to said chamber for access to said motor means coupling;
    c. a first shield for preventing microwaves from entering said housing chamber through said housing wall, said first shield coupled to said housing; and
    d. a second shield for preventing microwaves from entering said housing chamber through said opening in said housing wall, said second shield coupled to the housing.

2. The device of claim 1 in which said first shield comprises a layer of microwave reflective material adjacent the wall of said housing.

3. The device of claim 2 in which said housing wall includes an interior surface adjacent said chamber and a exterior surface outside said chamber, and said layer of microwave reflective material lies adjacent said interior surface.

4. The device of claim 2 in which said housing wall includes an interior surface adjacent said chamber and an exterior surface outside said chamber, and said layer of microwave reflective material lies adjacent said exterior surface.

5. The device of claim 2 in which said second shield comprises a plate of microwave reflective material transversely located relative to said opening to said housing chamber.

6. The device of claim 5 in which said plate includes mounting means for holding said plate to the mixing arm.

7. The device of claim 6 in which said opening to said housing chamber further includes a lip surrounding said opening, said lip includes a projecting wall extending outwardly from said opening.

8. The device of claim 1 in which said housing wall includes an interior surface adjacent said chamber and an exterior surface outside said chamber, and said first shield comprises a first layer of microwave reflective material adjacent said interior surface of said wall and a second layer adjacent said exterior surface of said wall.

9. The device of claim 1 in which said first shield comprises a microwave reflective barrier located in said wall of said housing.

10. The device of claim 1 in which said housing wall includes an interior surface adjacent said chamber and an exterior surface outside said chamber and said first shield comprises a layer of microwave reflective material between said interior and exterior surfaces.

11. The device of claim 1 in which said second shield comprises a plate of microwave reflective material transversely located relative to said opening to said housing chamber.

12. The device of claim 11 in which said plate includes mounting means for holding said plate to the mixing arm.

13. The device of claim 11 in which said opening to said housing chamber further includes a lip surrounding said opening, said lip includes a projecting wall extending outwardly from said opening.

* * * * *